United States Patent
Boys et al.

(10) Patent No.: US 10,411,613 B2
(45) Date of Patent: *Sep. 10, 2019

(54) INDUCTIVE POWER TRANSFER CONTROL

(71) Applicant: Auckland Uniservices Limited, Auckland (NZ)

(72) Inventors: John Talbot Boys, Auckland (NZ); Grant Anthony Covic, Auckland (NZ); Chang-Yu Huang, Auckland (NZ)

(73) Assignee: Aukland Uniservices Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,978

(22) Filed: Feb. 22, 2018

(65) Prior Publication Data
US 2018/0331630 A1 Nov. 15, 2018

Related U.S. Application Data

(63) Continuation of application No. 15/150,385, filed on May 9, 2016, now Pat. No. 9,912,250, which is a
(Continued)

(30) Foreign Application Priority Data

Aug. 13, 2010 (NZ) ........................ 587357

(51) Int. Cl.
*H02M 7/06* (2006.01)
*H02J 5/00* (2016.01)
(Continued)

(52) U.S. Cl.
CPC .............. *H02M 7/06* (2013.01); *H02J 5/005* (2013.01); *H02J 50/12* (2016.02); *H02M 3/28* (2013.01);
(Continued)

(58) Field of Classification Search
CPC .......... H02M 7/06; H02M 3/28; H02M 3/335; H02M 7/217; H02H 5/005; Y02B 70/1433; Y02B 70/1441; H02J 5/005; H02J 50/12
(Continued)

(56) References Cited

U.S. PATENT DOCUMENTS 6,151,231 A 11/2000 Saint-Pierre et al.
6,483,202 B1 11/2002 Boys
(Continued)

FOREIGN PATENT DOCUMENTS

CN 1551471 4/2004
EP 1475881 11/2004
(Continued)

OTHER PUBLICATIONS

Notification of Reasons of Rejection from Japanese Patent Office for corresponding Japanese Application No. 2013-524812, dated Aug. 5, 2015 and English translation of Notification.
(Continued)

*Primary Examiner* — Adolf D Berhane
(74) *Attorney, Agent, or Firm* — Law Office of Richard F. Jaworski

(57) ABSTRACT

An inductive power transfer (IPT) control method is disclosed for controlling the output of an IPT pick-up. The invention involves selectively shunting first and second diodes of a diode bridge to selectively rectify an AC current input for supply to a load, or recirculate the AC current to a resonant circuit coupled to the input of the controller. By controlling the proportion of each positive-negative cycle of the AC input which is rectified/recirculated, the output is regulated. Also disclosed is an IPT controller adapted to perform the method, an IPT pick-up incorporating the IPT controller, and an IPT system incorporating at least one such IPT pick-up.

18 Claims, 8 Drawing Sheets

Related U.S. Application Data continuation of application No. 13/816,630, filed as application No. PCT/NZ2011/000155 on Aug. 12, 2011, now Pat. No. 9,369,058.

(51) Int. Cl.
- *H02M 3/28* (2006.01)
- *H02M 3/335* (2006.01)
- *H02M 7/217* (2006.01)
- *H02J 50/12* (2016.01)

(52) U.S. Cl.
CPC ........... *H02M 3/335* (2013.01); *H02M 7/217* (2013.01); *Y02B 70/1433* (2013.01); *Y02B 70/1441* (2013.01)

(58) Field of Classification Search
USPC ............... 363/21.02, 21.06, 44, 125–127
See application file for complete search history.

(56) References Cited

U.S. PATENT DOCUMENTS

| | | | |
|---|---|---|---|
| 8,711,593 | B2 | 4/2014 | Ho et al. |
| 9,369,058 | B2 | 6/2016 | Boys |
| 2009/0303749 | A1 | 12/2009 | Boys et al. |
| 2010/0046259 | A1 | 2/2010 | Ho et al. |
| 2011/0116290 | A1 | 5/2011 | Boys |
| 2011/0221277 | A1 | 9/2011 | Boys |
| 2013/0039099 | A1 | 2/2013 | Wu et al. |
| 2014/0035382 | A1 | 2/2014 | Covic et al. |
| 2014/0293670 | A1 | 10/2014 | Robertson et al. |
| 2017/0098961 | A1* | 4/2017 | Harpham ............... H02J 50/12 |
| 2017/0222488 | A1* | 8/2017 | Madawala ............. H01F 38/14 |

FOREIGN PATENT DOCUMENTS

| | | |
|---|---|---|
| JP | 64-50686 | 3/1989 |
| JP | 2002345250 | 11/2002 |
| JP | 2009539343 | 11/2009 |
| WO | WO9602970 | 2/1996 |
| WO | WO2004042750 | 5/2004 |
| WO | WO2007139401 | 12/2007 |
| WO | WO2010030195 | 3/2010 |
| WO | WO2010062198 | 6/2010 |

OTHER PUBLICATIONS

Boys, J. T. et al. "Controlling Inrush Currents in Inductively Coupled Power Systems" Power Engineering Conference 2005, IPEC 2005, The 7$^{th}$ International Nov. 29 2005-Dec. 2, 2005, pp. 1046-1051 vol. 2.

* cited by examiner

INDUCTIVE POWER TRANSFER CONTROL

REFERENCE TO RELATED APPLICATIONS

The present disclosure is a continuation of and claims benefit from U.S. patent application Ser. No. 15/150,385, filed May 9, 2016 which is based on and claims benefit from U.S. patent application Ser. No. 13/816,630, filed Jun. 27, 2013 which is based on and claims benefit from International Application Number PCT/NZ2011/000155 filed on Aug. 12, 2011 which claims benefit from New Zealand application 587357 filed Aug. 13, 2010, the entire contents of each of which are herein incorporated by reference.

FIELD

This invention relates to the field of inductive power transfer. More particularly, the invention relates to a method and circuit for controlling the inductive transfer of power to a decoupling pick-up which minimises transient disturbance to the track current.

BACKGROUND

In inductive power transfer (IPT) systems, power is transferred inductively between a primary conductive path or track supplied by an alternating-current power supply (the power supply and track together forming a primary side of the IPT system), and one or more pick-ups inductively coupled with the track (forming the secondary side of the system).

The pick-up comprises a tuned or resonant circuit consisting of at least a pick-up coil and a tuning capacitor. Two common pick-up topologies are the series-tuned pick-up, in which the tuning capacitor is provided in series with the pick-up coil, and the parallel-tuned pick-up, in which the tuning capacitor is provided in parallel with the pick-up coil. The tuned circuit is typically electrically coupled to a control circuit (typically comprising a rectifier and a converter or regulator) to obtain the desired output to supply a load.

An alternative pick-up topology is known as the series-parallel tuned LCL (inductor-capacitor-inductor) pick-up, as shown by way of example in FIG. 1.

The series-parallel tuned LCL pick-up topology (hereinafter referred to as an LCL pick-up) is controlled with a slow switching (i.e. a switching frequency that is much less than the frequency of the IPT track) decoupling control method similar to a slow switching parallel-tuned pick-up. An issue with the slow switching topology is the transient inrush power drawn by the pick-up during normal power regulation. In multiple pick-up systems, each time the pick-up is switched on the transient power inrush transiently reduces the track current. This disturbance, if large, will limit the power flow to all other pick-ups coupled to the track. A control circuit topology for minimizing this track current transient disturbance using a parallel LC tuned pick-up controller was described by Boys, J. T.; Chen, C. I.; Covic, G. A.; "Controlling inrush currents in inductively coupled power systems," The 7th International Power Engineering Conference, 2005, Vol. 2, pp. 1046-1051, Nov. 29, 2005-Dec. 2, 2005. However, this simple approach cannot be used in the LCL topology using existing design approaches because it requires a large DC inductor for continuous current conduction in the switch mode circuit.

OBJECT OF THE INVENTION

It is therefore an object of the invention to provide a circuit and/or method which overcomes or ameliorates one or more disadvantages of the prior art, or alternatively to at least provide the public with a useful choice.

Further objects of the invention will become apparent from the following description.

SUMMARY OF INVENTION

Accordingly in one aspect the invention may broadly be said to consist in a control method for an inductive power transfer (IPT) pick-up comprising an AC input from a resonant circuit, the AC input being electrically coupled to a diode bridge adapted to rectify an AC current from the AC input and supply a DC current to a DC output, the method comprising:

selectively shunting a first diode of the diode bridge to cause the AC current to recirculate to the resonant circuit during a positive period of the AC current; and selectively shunting a second diode of the diode bridge to cause the AC current to recirculate to the resonant circuit during a negative period of the AC current;

wherein shunting of said first and second diodes is synchronised with the AC current whereby a predetermined proportion of said positive and negative periods of the AC current are rectified to supply the DC current to the DC output, and a remaining proportion of said positive and negative periods of the AC current are recirculated to the resonant circuit.

Preferably said predetermined proportion occurs at the beginning of each of the positive and negative periods of the AC current, wherein said first or second diode, respectively, conducts the AC current following a respective zero-crossing of the AC current, and the remaining proportion of the positive or negative period is recirculated by shunting said respective first or second diode at an appropriate time. This mode of operation where the diode conducts first is referred to in this document as Mode I.

Alliteratively said predetermined proportion occurs towards the end of each of the positive and negative periods of the AC current, wherein said first or second diode, respectively, is shunted upon a respective zero-crossing of the AC current to initially recirculate the AC current, and the respective first or second diode is then un-shunted to conduct the AC current for the predetermined proportion of the positive or negative period. This mode of operation where the diode is shunted first is referred to in this document as Mode II.

Preferably the predetermined proportion of said positive and negative periods is proportional to a desired DC output, wherein the method further comprises the steps of sensing the DC output and adjusting said predetermined proportion accordingly to obtain said desired DC output.

Preferably the method further comprises the step of slowly increasing said predetermined proportion to a required proportion upon switching on the pick-up.

Preferably the method further comprises the step of slowly decreasing said predetermined proportion to zero upon switching off the pick-up.

Preferably said shunting is selectively controlled by selectively closing first and second switches provided in parallel with respective said first and second diodes.

Preferably said first and second switches are opened when said first or second diodes, respectively, are conducting.

Preferably the resonant circuit comprises a series-parallel tuned LCL (inductor-capacitor-inductor) pick-up circuit.

According to a second aspect, the invention may broadly be said to consist in an IPT pick-up controller adapted to perform the method according to the first aspect of the invention.

According to a third aspect, the invention may broadly be said to consist in an inductive power transfer (IPT) pick-up controller comprising:
- an input for receiving an AC current from a resonant circuit;
- an output for supplying a DC current to a load; and
- a control circuit electrically coupling the input and the output, the control circuit comprising a diode bridge, shunting switches, and control means for selectively operating said switches to shunt first and second diodes of said diode bridge in synchrony with the AC current.

Preferably said control means is adapted to selectively shunt said first and second diodes using said shunting switches, whereby respective predetermined proportions of positive and negative periods of the AC current are rectified by the diode bridge and supplied to the output, and respective remaining proportions of the positive and negative periods of the AC current are recirculated to the resonant circuit.

Preferably said shunting switches comprise two switches, each of said two switches being provided in parallel with respective said first and second diodes, wherein said first and second diodes have a common anode.

Alternatively said shunting switches may comprise two switches having a common cathode, each provided in parallel with respective first and second diodes.

Preferably the switches comprise MOSFET transistors, wherein said first and second diodes comprise body diodes of said MOSFET transistors.

Preferably said control means further includes sensing means forming a feedback loop to sense the output and adjust said predetermined proportions to obtain a desired output.

Preferably said control means further includes a zero-crossing detector to synchronise shunting of the first and second diodes in relation to the zero-crossing of the AC current.

According to a fourth aspect, the invention may broadly be said to consist in an IPT pick-up adapted to perform the method according to the first aspect of the invention, and/or comprising an IPT pick-up controller according to the second or third aspects of the invention.

Preferably said resonant circuit comprises a series-parallel tuned LCL (inductor-capacitor-inductor) resonant circuit.

According to a fifth aspect, the invention may broadly be said to consist in an IPT system comprising at least one pick-up controller according to the second or third aspects of the invention, and/or at least one IPT pick-up according to the fourth aspect of the invention.

Further aspects of the invention, which should be considered in all its novel aspects, will become apparent from the following description.

DRAWING DESCRIPTION

A number of embodiments of the invention will now be described by way of example with reference to the drawings in which:

FIG. 6 is a graph showing the normalised output current versus switch conduction interval for various $V_{DC}/V_{oc}$ ratios for the same example circuit when operating in Mode II;

Figure 2:
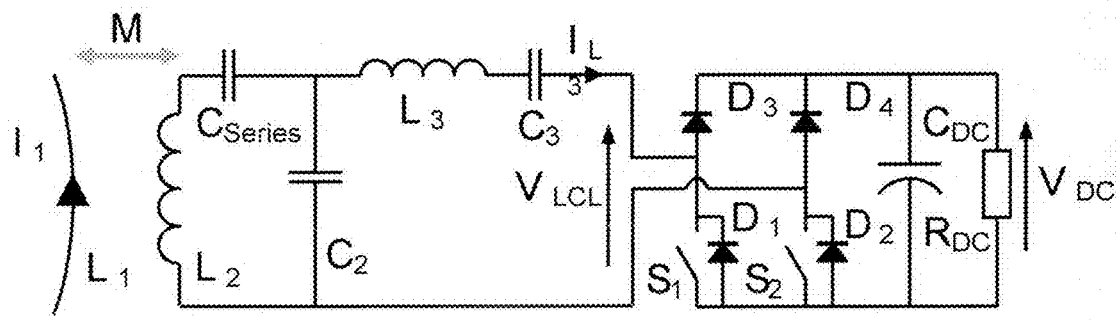
FIG. 2 is a circuit diagram of a series-parallel tuned LCL pick-up according to the present invention.

FIGS. 10(*a*), 10(*b*) and 10(*c*) show actual waveforms of an example pick-up circuit according to the present invention, using the circuit of FIG. 2 and operating in Mode I under various load conditions (⅓, ⅔ and rated load).

Figure 11:
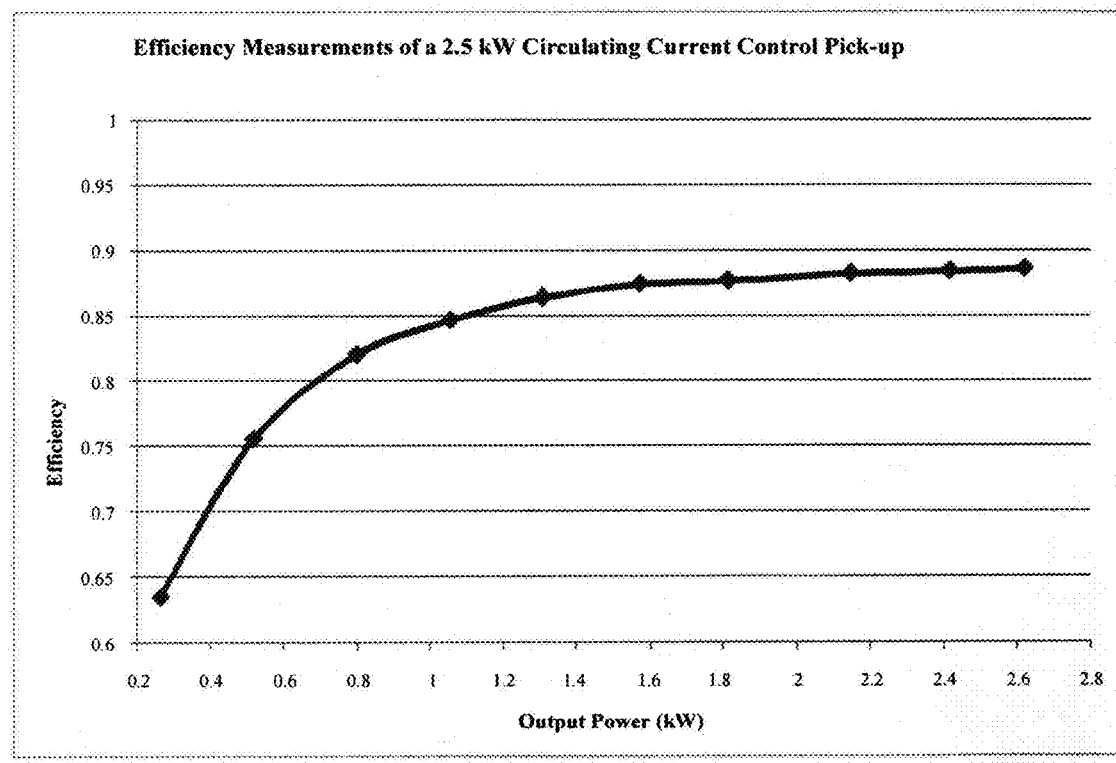

FIG. 11 shows efficiency measurements of the pick-up circuit according to the present invention, using the circuit of FIG. 2 operating in Mode I across the load range.

DETAILED DESCRIPTION OF THE DRAWINGS

Throughout the description like reference numerals will be used to refer to like features in different embodiments.

The present invention provides a control method and/or circuit for a series-parallel tuned LCL pick-up which achieves both rectification and power regulation. The invention is referred to generally in this document as "circulating current control". It operates in a similar fashion to a traditional SCR controlled rectifier where the switches are controlled to switch synchronously with the IPT track frequency. The duty cycle is controlled to ensure a smooth average output power is achieved, capable of providing a smooth power transition between a fully on and a fully off state or behaving as a fast switching (i.e. the switching frequency is similar to, or in synchronism with, the IPT track frequency) control topology.

Figure 1:
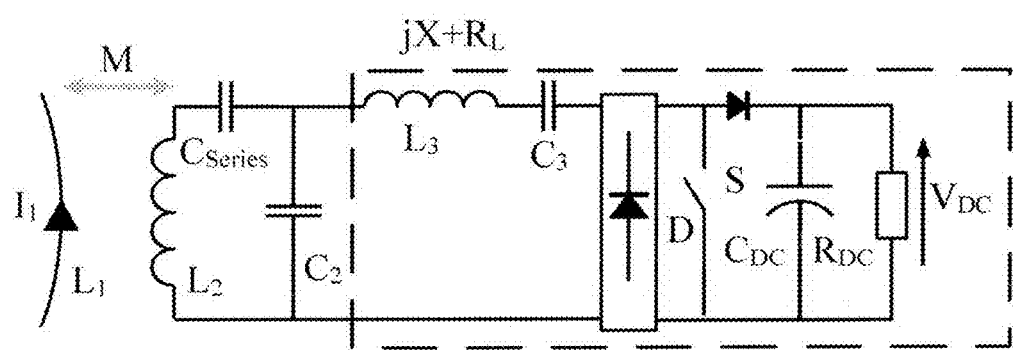
FIG. 1 is a circuit diagram of a series-parallel tuned LCL pick-up according to the prior art.

Referring first to the prior art pick-up shown in FIG. 1, the characteristic impedance X is given by:

$$X = \omega L_2 - \frac{1}{\omega C_{series}} = \frac{1}{\omega C_2} \quad (1)$$

Here, $C_{series}$ is used to increase the output current capability. The values of $L_3$ and $C_3$ are chosen so that the rectifier operates under continuous conduction for maximum output power, and are also designed to accommodate the extra inductance, introduced by the non-linear effect of the rectifier, to minimize the current in $L_2$. The slow switching controller for the LCL network operates in a similar manner to a parallel-tuned circuit, except that whereas in a parallel LC circuit the resonance collapses when the switch is closed, here in the LCL topology the full resonant current still circulates through $C_2$, $L_3$, $C_3$ and the rectifier. The real part of the reflected impedance $Z_r$ of the LCL network onto $L_1$ is expressed by:

$$Z_r = \frac{8}{\pi^2}\left(\frac{\omega M}{X}\right)^2 R_{DC}(1-D)^2 = \frac{2\sqrt{2}}{\pi}\frac{\omega^2 M^2}{X}\frac{V_{DC}}{V_{oc}}(1-D)^2 \quad (2)$$

$V_{DC}$ is the regulated DC output voltage of the circuit as shown in FIG. 2, and $V_{oc}$ is the open circuit voltage of the pick-up coil.

As shown in equation 2, the reflected impedance, which corresponds to the power drawn by the pick-up, back to the primary track is directly controlled by the switch duty cycle D. As the value of D changes from 1 (i.e. switch S in FIG. 1 remains closed) to 0 (i.e. switch S remains open) or vice versa, the power drawn from the power supply changes. In practice, however, the primary track current will also transiently decrease and temporarily affect the power transfer to other pick-ups on the same track.

The proposed circulating current control circuit, as shown by way of example in FIG. 2, preferably comprises four diodes ($D_1$, $D_2$, $D_3$, and $D_4$) in a diode bridge rectifier configuration, with switches ($S_1$ and $S_2$) respectively shunting the first and second diodes ($D_1$ and $D_2$) such that closing the switch $S_1$ or $S_2$ causes current to recirculate in the AC resonant circuit during the positive or negative period of $I_{L3}$, respectively. In practice, however, the shunted diodes of the diode bridge may comprise the body diodes of MOSFET transistors forming the switches $S_1$ and $S_2$.

The control circuit couples an AC current input to a DC output. In FIG. 2, the DC output is shown connected to a load, $R_{DC}$. The control circuit may also comprise a reservoir or smoothing capacitor $C_{DC}$ across the output/load, as shown.

The switches $S_1$ and $S_2$ are used to clamp part of the resonant current in $L_3$ ($I_{L3}$). $V_{g1}$ and $V_{g2}$ are the pulse-width modulated (PWM) gate signals which drive $S_1$ and $S_2$, and are synchronized with $I_{L3}$ as described in further detail below, using a zero-crossing detector, for example. The terms "synchronised", "synchrony" and the like as used herein are intended to refer to carefully controlling the time at which switching occurs, with respect to the AC current input. The phase angle between the AC input and switching is not necessarily simultaneous with, for example, a zero crossing of the AC current input so that switching occurs at precisely the same time every cycle, but is controlled and if necessary varied with respect to the zero crossing so as to regulate or otherwise control the output of the IPT pick-up controller.

For one skilled in the art it is clear that a similar control output could be achieved if the two control switches were moved to shunt the top two diodes rather than the bottom two diodes of the rectifier. In this case switches $S_3$ and $S_4$ can operated to shunt $D_3$ and $D_4$ and can also be operated with two possible modes of control (as discussed herein) to achieve a similar result. In this configuration, gate drive signals discussed herein for $S_1$ would be used to drive $S_4$ while the gate drive for $S_2$ would be used to drive $S_3$. Other such variations or modifications of the circuit are possible with departing from the scope of the invention.

The pick-up controller circuit of the present invention may be operated in two ways. The first mode of operation is to allow $D_3$ or $D_4$ to conduct at the beginning of the positive period or the negative period, respectively, of $I_{L3}$ and then turn on $S_1$ or $S_2$ to clamp part of $I_{L3}$ to regulate output power. As mentioned previously in this document, this operation mode is referred to as Mode I.

The second mode of operation is to keep $S_1$ or $S_2$ conducting at the beginning of the positive or the negative period of $I_{L3}$ and then turn off the switch to allow part of $I_{L3}$ to be transferred to the load. As mentioned previously in this document, this operation mode is referred to as Mode II.

The switches $S_1$ and $S_2$ may be controlled using any suitable control means, such as a microcontroller and/or logic circuit, for example. The control means may also include sensing means (to sense the pick-up output current, voltage and/or power) and a feedback loop to allow control and/or regulation of the pick-up circuit output. Various different control means may thus be used without departing from the scope of the invention. Implementation of a suitable control means is considered to be within the capabilities of a technician skilled in the art.

Figure 3:
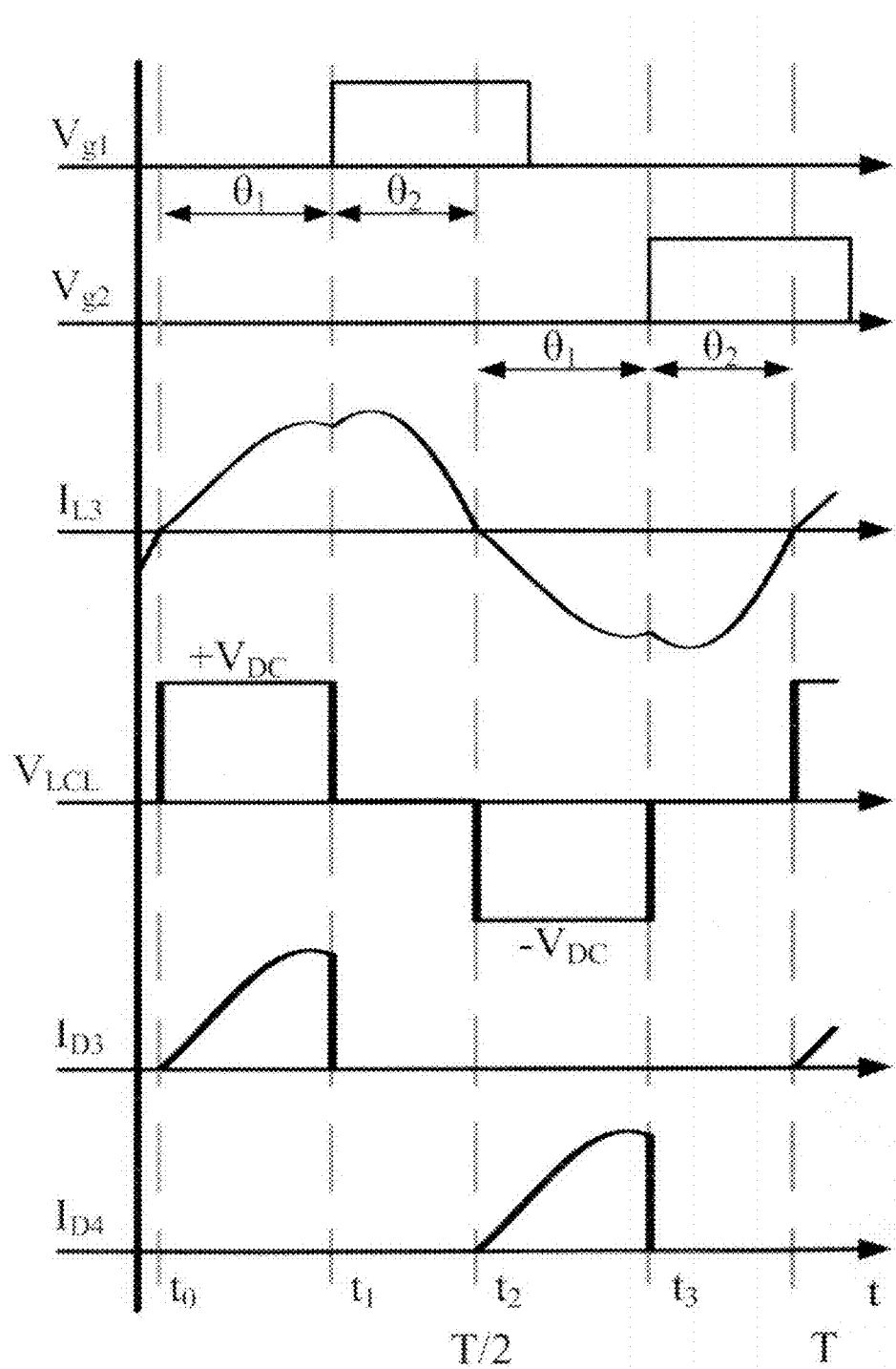
FIG. 3 shows simulated waveforms of an example of a circuit as shown generally in FIG. 2, when operating in a first mode (being Mode I)

The operation of Mode I is illustrated in the waveforms of FIG. 3.

The rising edge of the gate signals and thus the duty cycle of $V_{g1}$ and $V_{g2}$ are controlled with a phase delay $\theta_1$ (called the diode conduction interval) referenced to the respective negative-to-positive and positive-to-negative zero-crossings of $I_{L3}$ as shown in FIG. 3.

At $t_0$, current $I_{L3}$ has just turned positive. With the first switch $S_1$ being at the default off state, the diode $D_3$ starts to conduct. The current $I_{L3}$ is then transferred to the load $R_{DC}$ via $D_3$ and the body diode $D_2$ of $S_2$ for a predetermined proportion of the positive period of the current $I_{L3}$. The instantaneous output voltage of the LCL network is equal to $+V_{DC}$.

At $t_1$ where the diode conduction interval $\theta_1$ is reached, $S_1$ is turned on and $I_{L3}$ circulates through $S_1$ and the body diode $D_2$ of $S_2$ to stop power being transferred to the load $R_{DC}$ for the remaining proportion of the positive period of the current $I_{L3}$. Instead, the current is recirculated to the resonant circuit.

At $t_2=T/2$, $I_{L3}$ turns negative so that $D_4$ conducts for a predetermined proportion of the negative period of $I_{L3}$ and the circuit is completed with the first diode $D_1$, the body diode of $S_1$. While the $S_1$ body diode $D_1$ is conducting, $S_1$ can be turned off with zero current. The instantaneous value of $V_{LCL}=-V_{DC}$. The power transferred to the load $R_{DC}$ is identical in the second (negative) half cycle provided the phase delay (the diode conduction interval) $\theta_1$ is maintained constant.

At $t_3$, the gate signal $V_{g2}$ turns on $S_2$ to keep $I_{L3}$ circulating through $S_2$ and the body diode $D_1$ of $S_1$ for the remaining proportion of the negative period of $I_{L3}$, recirculating the current to the resonant circuit. As $I_{L3}$ circulates through the body diode of $S_1$, the gate signal $V_{g1}$ can turn $S_1$ off anytime between T/2 and T.

With switches $S_1$ and $S_2$ thus controlled such that they are synchronised with $I_{L3}$, the output current ($I_{D3}+I_{D4}$) is a rectified, chopped (near) sine wave. By controlling the diode conduction interval $\theta_1$, or equivalently the switch conduction interval $\theta_2$ (here $\theta_2=T/2-\theta_1$) the average output current is directly and smoothly controlled. $\theta_1$ can be varied from 0 to $\pi$.

Figure 4:
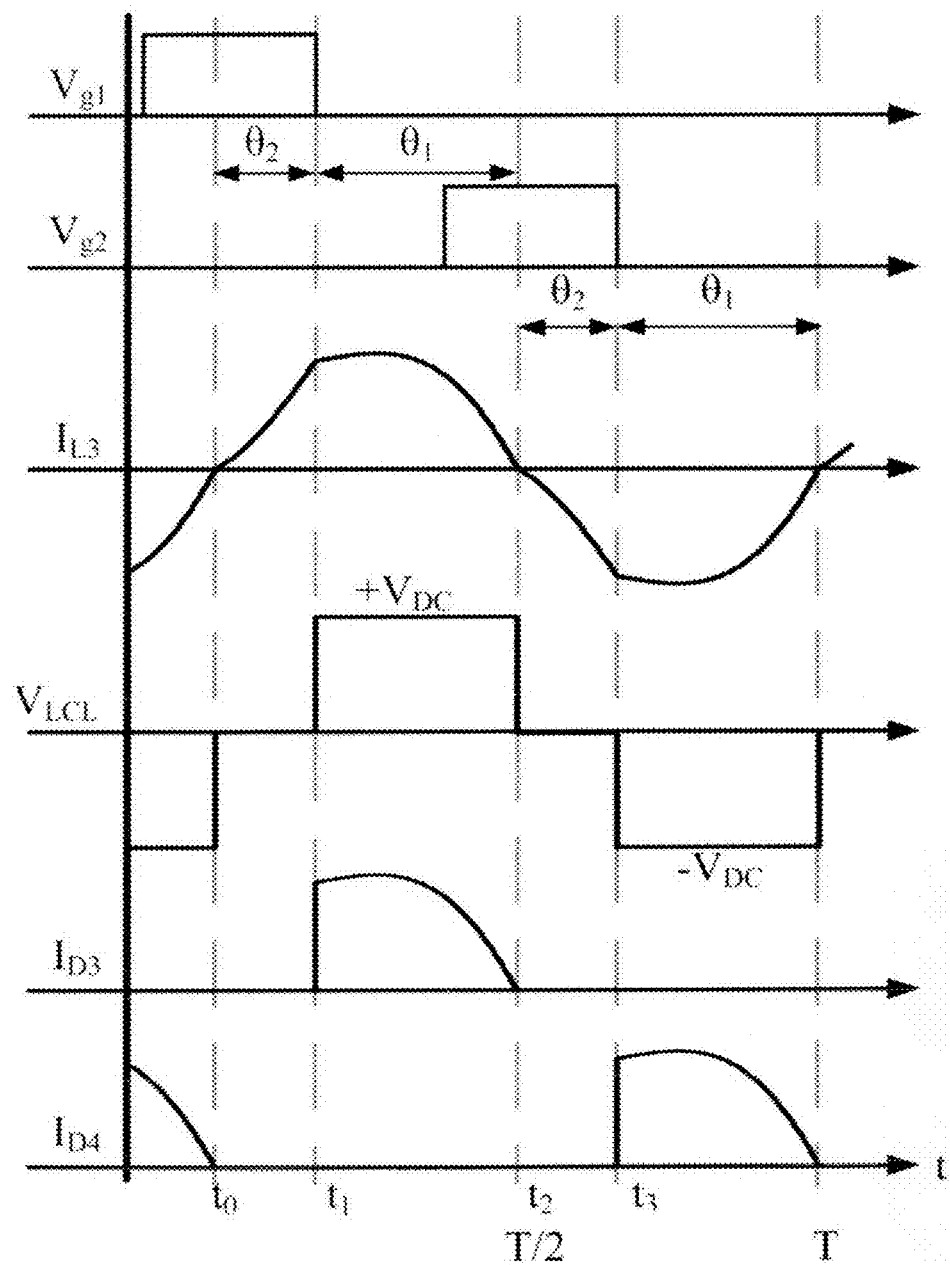
FIG. 4 shows simulated waveforms of the same example circuit when operating in a second mode (being Mode II)

Mode II operation is illustrated in FIG. 4. It operates in a very similar fashion to Mode I but with a different switching sequence. The falling edge of the gate signals and thus the duty cycle of $V_{g1}$ and $V_{g2}$ are controlled with a switch conduction interval $\theta_2$ referenced to $I_{L3}$ as shown in FIG. 4.

Before current $I_{L3}$ turns positive at $t_0$, the body diode $D_1$ of switch $S_1$ is already turned on with $I_{L3}$ flowing in the negative direction. Thus, turning on $S_1$ during the negative period of $I_{L3}$ will result in zero current/zero voltage switching.

At $t_0$, $I_{L3}$ turns positive. With $S_1$ being turned on, $I_{L3}$ is forced to recirculate through $S_1$ and the second diode $D_2$, the body diode of $S_2$, to the resonant circuit. No power is transferred to the load $R_{DC}$ for this proportion of the positive period of $I_{L3}$ (equivalent to the "remaining proportion" of the positive period in Mode I operation).

At $t_1$ where the switch conduction interval $\theta_2$ is reached, $S_1$ is turned off and $I_{L3}$ circulates through $D_3$ and the body diode $D_2$ of switch $S_2$ to transfer power to the load for a predetermined proportion of the positive period of $I_{L3}$. During this proportion, the instantaneous LCL output voltage $V_{LCL}$ is $+V_{DC}$. Anytime between $t_0$ to T/2, $V_{g2}$ could turn $S_2$ on with zero current/zero voltage switching like $S_1$.

At $t_2=T/2$, $I_{L3}$ turns negative so that $D_3$ turns off softly and $I_{L3}$ recirculates through $S_2$ and the body diode of $S_1$ to the resonant circuit.

At $t_3$, the gate signal $V_{g2}$ turns off $S_2$ to allow $I_{L3}$ to transfer power to the load through $D_4$ for a predetermined proportion of the negative period of $I_{L3}$. The instantaneous value of the LCL output voltage $V_{LCL}$ is $-V_{DC}$.

With the switch conduction interval $\theta_2$ and diode conduction interval $\theta_1$ maintained constant, the power transferred to the output in each half-cycle is identical.

By controlling the switch conduction interval $\theta_2$ of both switches $S_1$ and $S_2$ synchronously with $I_{L3}$, the output power is directly and smoothly controlled. This provides the capability for regulating the output power with variable mutual coupling in comparison to the traditional slow switching control topology. The present invention also allows a smooth transition between a fully on and fully off state of the LCL pick-up in slow switching applications by ramping up and down the duty cycle from zero power to full power, thereby minimizing track current transient disturbance.

Derivation of a theoretical expression for describing the DC output current with respect to either the diode conduction interval $\theta_1$ or switch conduction interval $\theta_2$ is impractical.

Figure 5:
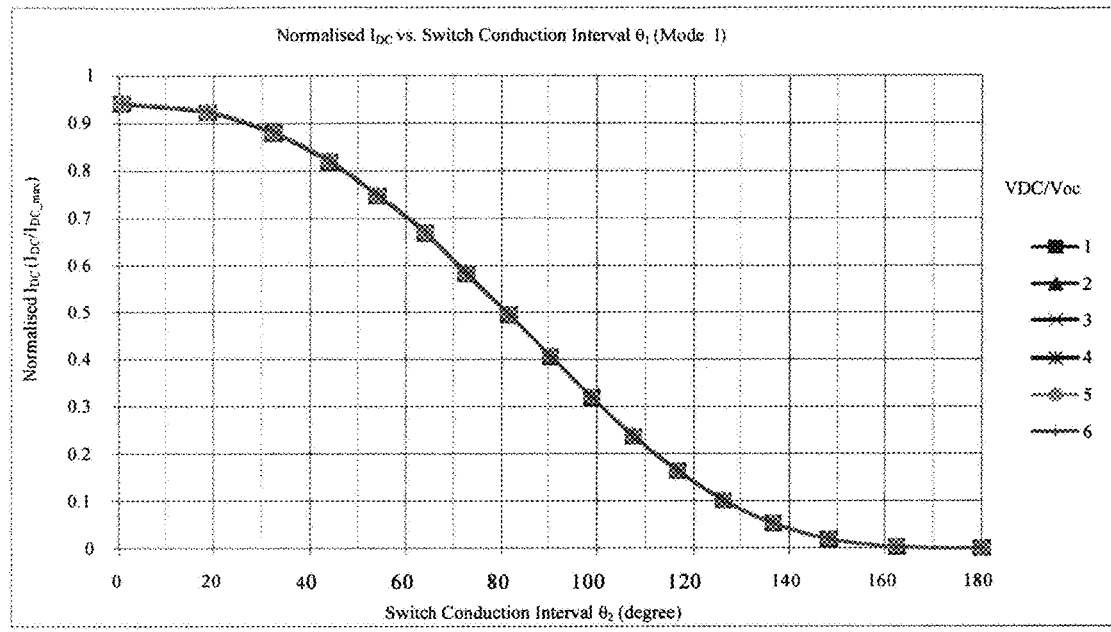

Instead, a numerical solution is presented below. The circulating current controller for both suggested operation modes are simulated with various ratios of $V_{DC}/V_{oc}$. The normalized output current for different $V_{DC}/V_{oc}$ ratios are shown in FIG. 5 for the Mode I operation. Here $I_{dc\_max}$ is the ideal maximum output current of an LCL pick-up and is given by:

$$I_{dc\_max} = \frac{2\sqrt{2} \cdot V_{oc}}{\pi X} \quad (3)$$

The SPICE simulation results shown in FIG. 5 demonstrate that the relationship between the output current and the switch conduction interval $\theta_2$ is not affected by $V_{DC}/V_{oc}$. This is due to the output current source characteristic of the LCL network. The ideal output DC current of the LCL network is a rectified sine wave with zero switch conduction interval. With harmonics introduced into the output current by the rectifier, this causes the output current to be slightly distorted from an ideal sine wave. Thus, with a switch conduction interval of zero, the normalized maximum output current is around 0.95 instead of 1. With the switch conduction interval $\theta_2$ controlled from 0° to 180° the output power can be precisely controlled and regulated according to the relationship shown in FIG. 5.

The simulation results shown in FIG. 5 (and the figures which follow) are for a particular example of a circuit according to the present invention, as generally shown in FIG. 2. For a different LCL design (i.e. different inductance and capacitance values), the profile of the output current and reflected impedance will be different.

Figure 6:
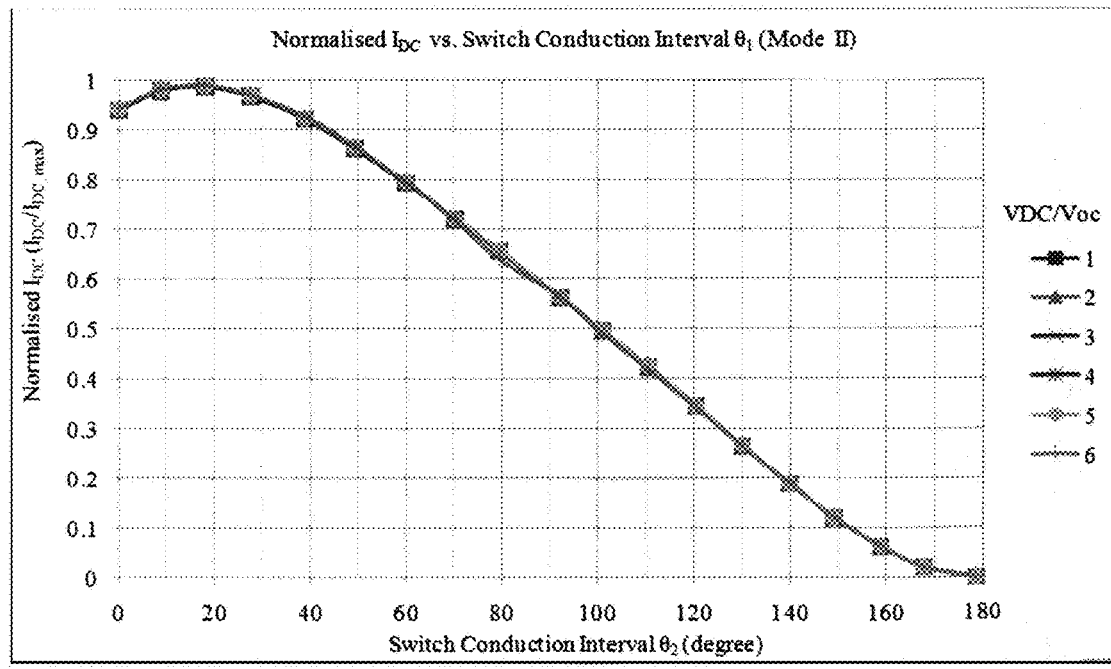
FIG. 6 is a graph showing the normalised output current versus switch conduction interval for various $V_{DC}/V_{oc}$ ratios for the same example circuit when operating in Mode I.

Simulation results of normalized output current for various $V_{DC}/V_{oc}$ ratios in the Mode II operation are shown in FIG. 6. Similar to Mode I, the normalised DC output current with respect to the switch conduction interval $\theta_2$ is the same for various $V_{DC}/V_{oc}$ ratios. However, the relationship between the output DC current and the switch conduction interval $\theta_2$ is completely different. Between 0° to 20° the output DC current increases with increasing switch conduction interval instead of decreasing as in Mode I. Between 20° to 180°, the DC current drops with increase of switch conduction interval. Comparing with Mode I, the decay of DC current is a lot slower for Mode II operation. This is thought to be caused by the extra current harmonics introduced by the switching action. With Mode I operation, the introduced harmonics circulate through the switches and $L_3$ instead of circulating to the load. Therefore, between switch conduction interval of 0° to 20°, with the introduced current harmonics in $I_{L3}$ the resultant output current is greater than when the switches are fully off, and a different overall output current behaviour is observed between these two operations.

With pick-up switch conduction interval $\theta_2$ varying from 0° to 180° the output power is controlled but the phase of the LCL AC fundamental output voltage is also varied relative to $I_{L3}$. This introduces an extra Var load into the LCL network for both operation modes. This Var load reflects back onto the primary track causing the power supply to be slightly mistuned. Simulation results of the normalized reflected reactive impedance for various ratios of $V_{DC}/V_{oc}$ are shown in FIGS. 7 and 8 for Mode I and Mode II of operation, respectively.

Figure 7:
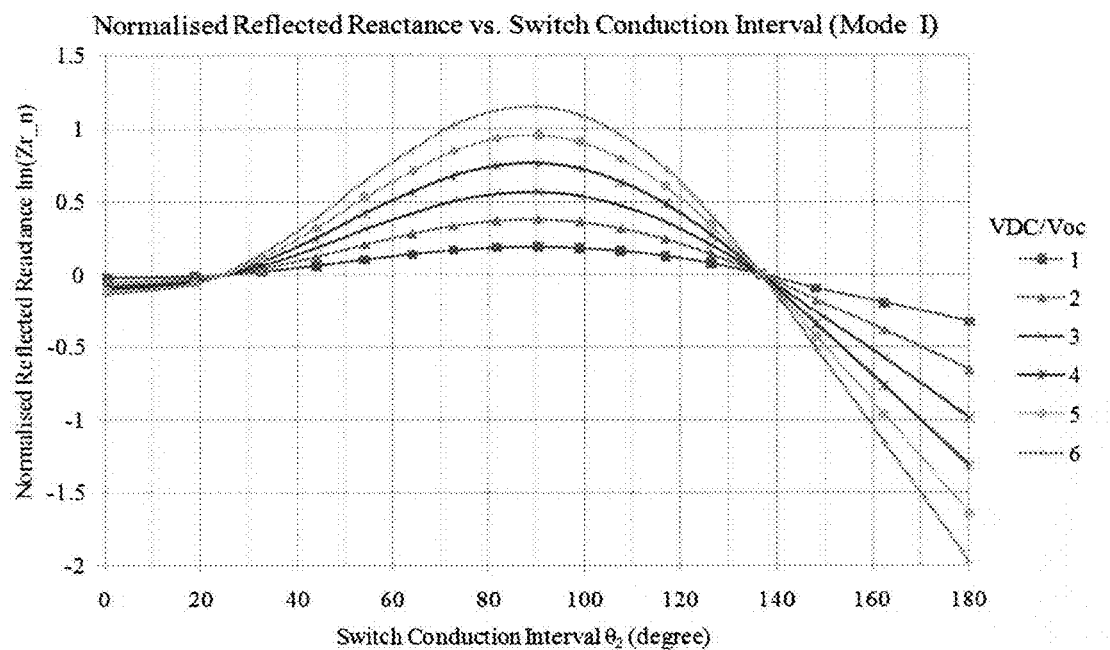
FIG. 7 is a graph showing the normalised reflected reactive impedance versus the switch conduction interval for various $V_{DC}/V_{oc}$ ratios for the same example circuit when operating in Mode I.

In Mode I operation (as shown in FIG. 7), the reflected impedance swings between an inductive and a capacitive load for different switch conduction intervals. When the switch conduction interval $\theta_1$ is maintained between 0° and 135°, the reflected load seen by the primary track is inductive which slightly increases the track inductance. This happens because the phase of $V_{LCL}$ leads $I_{L3}$. With an increase of phase difference between $V_{LCL}$ and $I_{L3}$ the reflected inductive load keeps on increasing. This increase in the reflected inductive load gradually slows down until the switch conduction interval $\theta_2$ reaches around 90° where it starts decreasing. This is because the magnitude of $V_{LCL}$ keeps decreasing with the increase in switch conduction interval $\theta_2$. Therefore, the increase in phase difference between $V_{LCL}$ and $I_{L3}$ becomes less dominant. When the switch conduction interval $\theta_2$ varies between 135° and 180° the reflected impedance to the primary is capacitive, which slightly reduces the track inductance. This is because the combined impedance of $L_3$ and $C_3$ is normally less than X to accommodate the inductance introduced by the rectifier. The amount of reflected impedance back to the track is proportional to the $V_{DC}/V_{oc}$ ratio.

Figure 8:
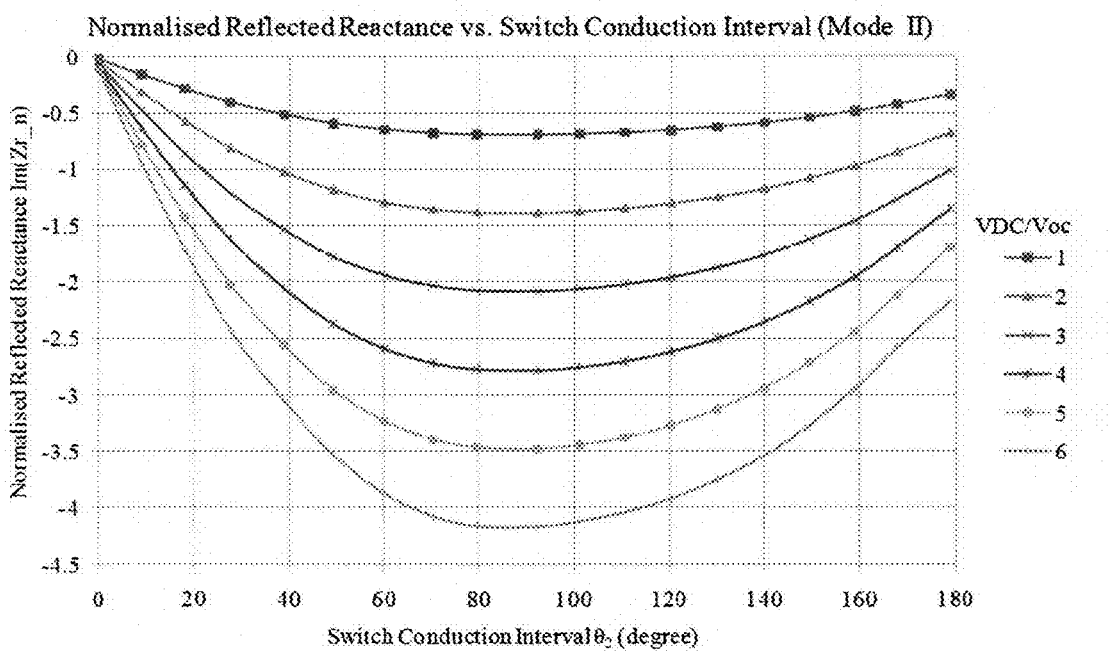
FIG. 8 is a graph showing the normalised reflected reactive impedance versus the switch conduction interval for various $V_{DC}/V_{oc}$ ratios for the same example circuit when operating in Mode II.

Unlike Mode I operation, the reflected impedance during Mode II operation is purely capacitive, as shown in FIG. 8. This is due to the phase between $V_{LCL}$ and $I_{L3}$ are in the opposite way as to Mode I (i.e. here in Mode II $V_{LCL}$ lags $I_{L3}$). The maximum reflected reactive impedance occurs at the same conduction interval of 90° and it is proportional to the $V_{DC}/V_{oc}$ ratio as it is under Mode I operation.

An example embodiment of the present invention is described below by way of example. A 2.5 kW 50V implementation of the proposed circulating current duty cycle control pick-up was built and tested using a commercially-available Wampfler™ 10 kW IPT power supply, which also uses an LCL resonant network for an AGV (automated guided vehicle) application. However, the pick-up of the present invention may be used with any suitable power supply, as will be appreciated by those skilled in the art.

The pick-up parameters and the track inductance of this example are listed in Table 1 below.

TABLE 1

| $I_1$ | 125 A | M | 3.56 µH | $V_{oc}$ | 56 V |
|---|---|---|---|---|---|
| $L_1$ | 26 µH | f | 20 kHz | $V_{DC}$ | 50 V |
| $L_2$ | 100 µH | $P_{out}$ | 2.5 kW | X | 1 Ω |

Figure 9:
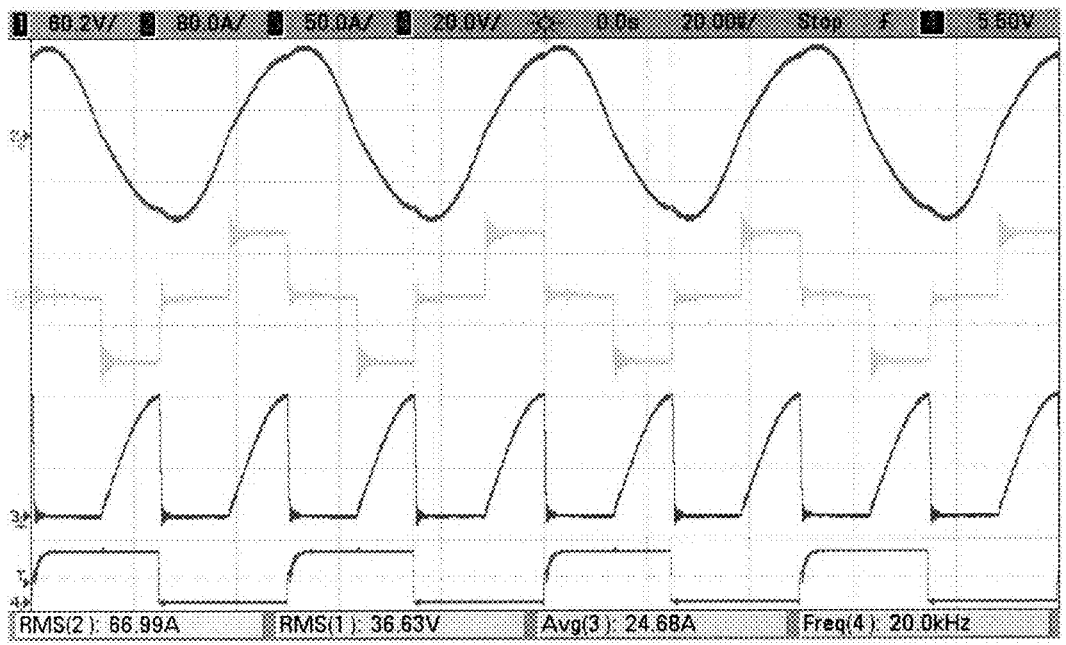
FIG. 9 shows actual waveforms of an example pick-up circuit according to the present invention, using the circuit of FIG. 2 and operating under Mode I at half rated load.

An oscilloscope capture of the pick-up operating at half the rated power is shown in FIG. 9 operating in Mode I. The top waveform is the current in $L_3$ ($I_{L3}$), the second waveform is the LCL AC output voltage ($V_{LCL}$), while the third waveform is the total output current of $D_3$ and $D_4$ ($I_{D3}+I_{D4}$). The last (bottom) waveform is the switch gate driving signal $V_{g1}$. This capture shows that the output voltage of the AC tuned network $V_{LCL}$ is successfully controlled by controlling the diode conduction interval $\theta_1$, relative to $I_{L3}$.

Figure 10A:
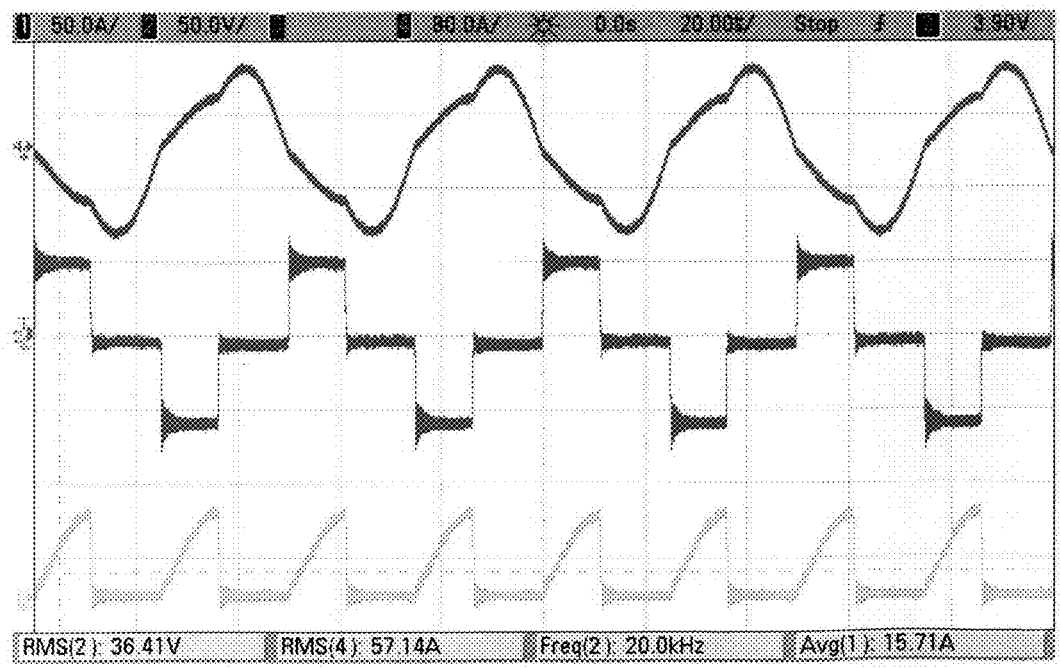
Figure 10B:
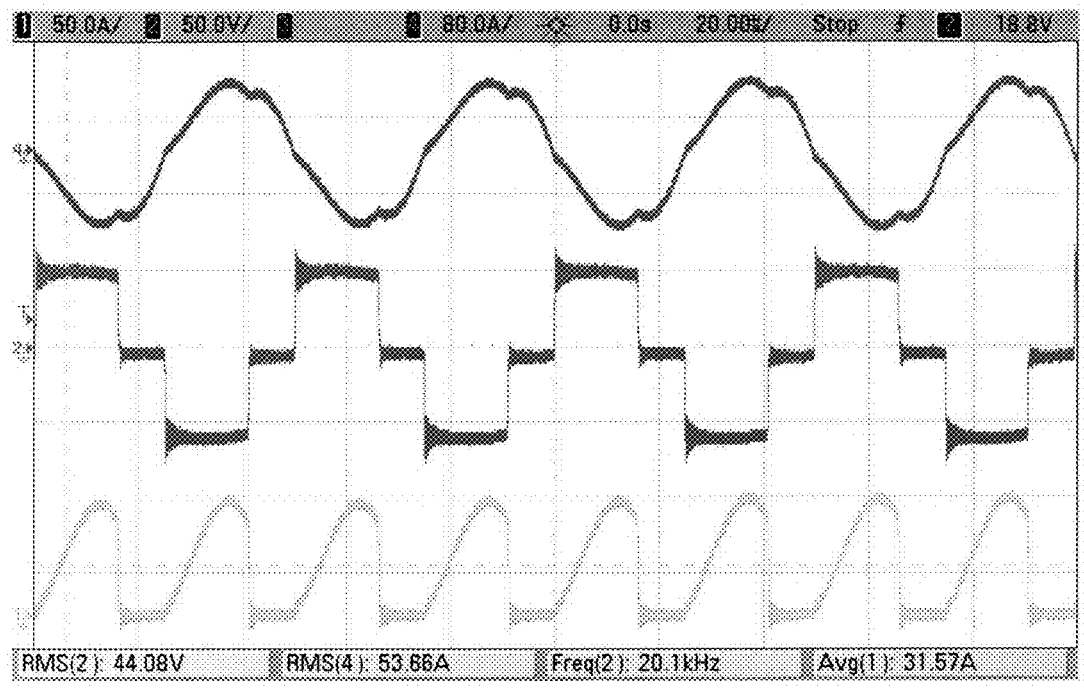
Figure 10C:
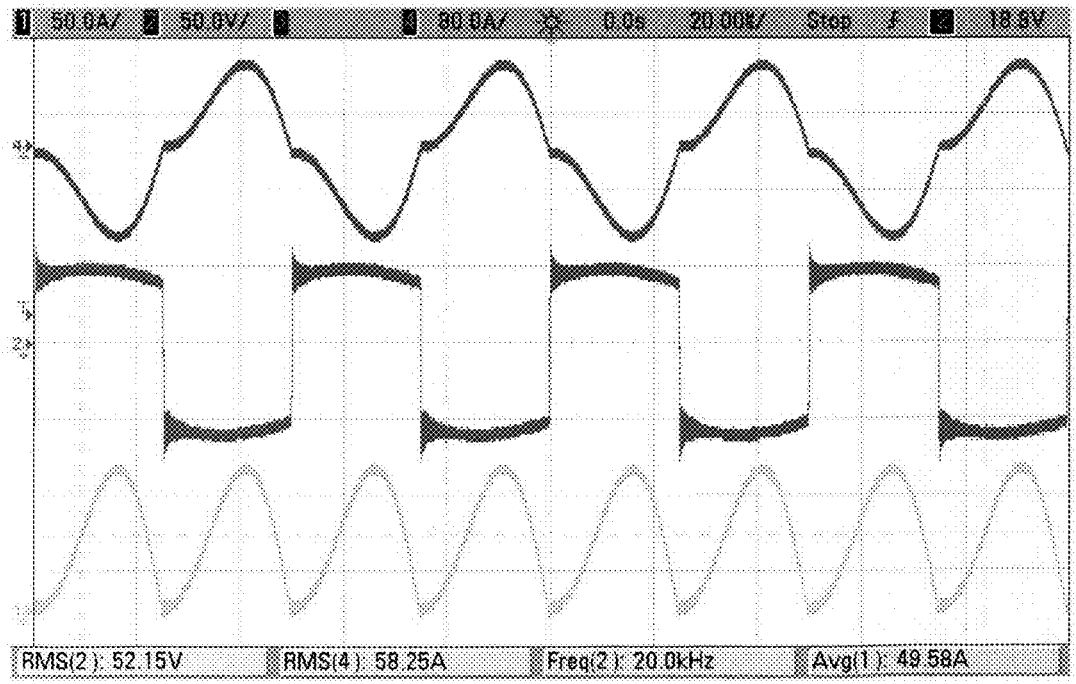

FIG. 10 shows an oscilloscope capture of the pick-up operating in Mode I at other loading conditions, without the switch gate driving waveform FIG. 10(a) shows operation at ⅓ rated load, FIG. 10(b) shows operation at ⅔rds rated load, and FIG. 10(c) shows operation at rated load.

The pick-up efficiency measurements under various loading conditions are shown in FIG. 11. As seen from FIG. 11, the example pick-up achieves an efficiency of 88% at full load and is still above 85% at half load. This controller operates at 50V and 50 A where high efficiency is difficult to achieve.

As discussed above, the circulating current duty cycle control method of the present invention reflects a variable reactive impedance depending on the controlled switch conduction interval. With the presented system parameters in Table 1, the maximum reflected reactive impedance of the prototype system can be calculated using FIGS. 7 and 8.

With Mode I operation the maximum reflected inductive load occurs with a switch conduction interval of 80° as shown in FIG. 7. The maximum reflected capacitive load occurs at 180°, which corresponds with the pick-up being fully off. The calculated maximum reflected inductive impedance is 0.0415Ω, which corresponds to increasing the primary track inductance by 0.33 µH. The Wampfler 10 kW primary power supply track is tuned to 26 µH with a tolerance of +/−2 µH, so it would require 6 pick-up controllers operating simultaneously at 80 degrees switch conduction interval to accumulate up to 2 µH. Since this example system is not designed to carry more than 4 pick-ups at any one time to prevent power supply overloads, the reflected inductive load would not be an issue in this design. On the other hand, the maximum reflected capacitive impedance is −0.0726Ω, which corresponds to reducing the primary track inductance by 0.577 µH. It would take up to 4 controllers, fully off, to exceed the −2 µH threshold.

With Mode II operation the reflected reactive impedance is purely capacitive and the maximum reflected impedance occurs with an 80° switch conduction interval as discussed above. Using Table 1 and FIG. 8, the maximum reflected reactance is −0.151Ω, which corresponds to reducing the primary track inductance by 1.202 µH. If more than 1 pick-up on the track switches at the same time, the detuning effect to the power supply will exceed the 2 µH threshold. Thus, under this circumstance the circulating current duty cycle control could be used as a transition scheme between the pick-up controller being fully off and on in a slow switching control method. With a sequential switching (i.e. interleaving switching) control method, no more than 2 pick-ups could be switching on the same track at the same time when operating in Mode II to avoid reflected reactance overloads in the power supply. However, a power supply adopting an LCL resonant network topology has better tolerance for its track inductance being less than its designed value, while only slightly compromising the maximum power rating of the power supply. Therefore, although the extra Var load introduced by the proposed circulating current duty cycle controller slightly detunes the primary power supply, in practice this VAR load can easily be handled by normal system parameter tolerances.

As described above, the method of the present invention would typically be implemented by control means which may comprise some form of computing means or digital or mixed-signal computing device or processor, such as a microcontroller adapted to provide appropriate gate voltages to switches $S_1$ and $S_2$, for example. Once programmed to perform particular functions pursuant to instructions from program software that implements the method of this invention, the computing device in effect become a special-purpose computing device particular to the method of this invention. The techniques necessary for this are well-known to those skilled in the art of embedded systems.

Computer programs implementing the method of this invention may be distributed to users on a distribution medium such as floppy disk, CD-ROM, or USB flash memory. From there, they may be copied to a hard disk, embedded solid-state memory, or a similar intermediate storage medium. When the programs are to be run, they will be loaded either from their distribution medium or their intermediate storage medium into the execution memory of the computing means, configuring the computing means to act in accordance with the method of the invention. All these operations are well-known to those skilled in the art of computer systems.

The term "computer-readable medium" encompasses distribution media, intermediate storage media, execution memory of a computer, and any other medium or device capable of storing for later reading by a computing device implementing the method of this invention.

Alternatively, the inventive method may be performed entirely in hardware, by a plurality of discrete electronic components and/or an application specific integrated circuit (ASIC), for example.

The invention, and in particular the control means, may therefore be said to consist in a computer program adapted to perform the method of the invention, a computer-readable medium storing such a computer program, and/or a hardware system adapted to perform the above-described method of the invention.

From the foregoing it will be seen that a pick-up control method and a pick-up controller are provided which allows the regulation of output power in a slow-switching series-parallel tuned LCL pick-up topology. This regulation allows either or both of compensation for variations in the mutual coupling between the pick-up and the primary track, and ramping up/down between the pick-up output levels to minimize track current transient disturbance.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A control method for an inductive power transfer (IPT) pick-up, the pick-up comprising a resonant circuit producing an AC input current, a rectifier circuit comprising a first switch operable to shunt a first diode of a diode bridge and a second switch operable to shunt a second diode of the diode bridge, and a DC output, wherein the AC input current is rectified to supply the DC output, the method comprising:
selectively operating the switches to shunt first and second diodes of the diode bridge in synchrony with the AC current to provide the DC output.

2. A The control method of claim 1 further comprising:
selectively operating the first switch to shunt the first diode of the diode bridge to cause the AC current to recirculate to the resonant circuit during a positive period of the AC current; and
selectively operating the second switch to shunt the second diode of the diode bridge to cause the AC current to recirculate to the resonant circuit during a negative period of the AC current;
wherein shunting of said first and second diodes is synchronised with the AC current whereby a predetermined proportion of said positive and negative periods of the AC current are rectified to supply the DC current to the DC output, and a remaining proportion of said positive and negative periods of the AC current are recirculated to the resonant circuit.

3. The control method of claim 1, wherein the predetermined proportion occurs at a beginning of each of the positive and negative periods of the AC current, wherein said first or second diode, respectively, conducts the AC current following a respective zero-crossing of the AC current, and the remaining proportion of the positive or negative period is recirculated by shunting said respective first or second diode at an appropriate time.

4. The control method of claim 1, wherein the predetermined proportion occurs towards an end of each of the positive and negative periods of the AC current, wherein said first or second diode, respectively, is shunted upon a respective zero-crossing of the AC current to initially recirculate the AC current, and the respective first or second diode is then un-shunted to conduct the AC current for the predetermined proportion of the positive or negative period.

5. The control method of claim 1, wherein the predetermined proportion of said positive and negative periods is proportional to a desired DC output, wherein the method further comprises sensing the DC output and adjusting said predetermined proportion accordingly to obtain a desired DC output.

6. The control method of claim 1, wherein the method further comprises slowly increasing said predetermined proportion to a required proportion upon switching on the pick-up.

7. The control method of claim 1, wherein the method further comprises slowly decreasing said predetermined proportion to zero upon switching off the pick-up.

8. The control method of claim 1, wherein said shunting is selectively controlled by selectively closing first and second switches provided in parallel with respective said first and second diodes.

9. The control method of claim 8 wherein said first and second switches are opened when said first or second diodes, respectively, are conducting.

10. An IPT pick-up controller adapted to perform the method according to claim 1.

11. The control method of claim 1 further comprising selecting a required DC output, and ramping a duty cycle for the switches over a plurality of cycles of the AC current to change the DC output toward the required DC output.

12. An inductive power transfer (IPT) pick-up controller comprising:
an input for receiving an AC current from a resonant circuit;
an output for supplying a DC current to a load; and
a control circuit electrically coupling the input and the output, the control circuit comprising a diode bridge, shunting switches, and a controller for selectively operating said switches to shunt first and second diodes of said diode bridge in synchrony with the AC current.

13. The IPT pick-up controller of claim 12, wherein the controller is adapted to selectively shunt said first and second diodes using said shunting switches, whereby respective predetermined proportions of positive and negative periods of the AC current are rectified by the diode bridge and supplied to the output, and respective remaining proportions of the positive and negative periods of the AC current are recirculated to the resonant circuit.

14. The IPT pick-up controller of claim 12, wherein said shunting switches comprise two switches, said switches being provided in parallel with respective said first and second diodes, wherein said first and second diodes have a common anode.

15. The IPT pick-up controller of claim 12, wherein the switches comprise MOSFET transistors and said first and second diodes comprise body diodes of said MOSFET transistors.

16. The IPT pick-up controller of claim 13, wherein said controller further comprises a sensor forming a feedback loop to sense the output and enabling adjustment of said predetermined proportions to obtain a desired output.

17. The IPT pick-up controller of claim 12, wherein said controller further comprises a zero-crossing detector to synchronise shunting of the first and second diodes in relation to zero-crossing of the AC current.

18. The IPT pick-up controller of claim 12, wherein the controller receives a required DC output, and ramps a duty cycle for the switches over a plurality of cycles of the AC current to change the DC output toward the required DC output.

* * * * *